(12) United States Patent
Krishnan et al.

(10) Patent No.: US 8,085,793 B2
(45) Date of Patent: Dec. 27, 2011

(54) TRAFFIC LOCALIZATION WITH PROXY MOBILITY

(75) Inventors: Suresh Krishnan, Montreal (CA); Laurent Marchand, Montreal (CA)

(73) Assignee: telefonaktiebolaget LM Ericsson (Publ), Stockholm (SE)

( * ) Notice: Subject to any disclaimer, the term of this patent is extended or adjusted under 35 U.S.C. 154(b) by 193 days.

(21) Appl. No.: 11/948,269

(22) Filed: Nov. 30, 2007

(65) Prior Publication Data

US 2009/0080441 A1  Mar. 26, 2009

Related U.S. Application Data

(60) Provisional application No. 60/974,663, filed on Sep. 24, 2007.

(51) Int. Cl.
*H04L 12/28* (2006.01)
(52) U.S. Cl. ........ 370/400; 370/401; 370/396; 370/402; 455/436; 455/439; 455/438
(58) Field of Classification Search .............. 370/328, 370/329, 331, 466, 401, 400, 389, 395.2; 455/436, 439, 438, 440, 444
See application file for complete search history.

(56) References Cited

U.S. PATENT DOCUMENTS

| | | | |
|---|---|---|---|
| 2002/0067731 A1* | 6/2002 | Houston et al. ............. | 370/401 |
| 2003/0018810 A1* | 1/2003 | Karagiannis et al. ........ | 709/238 |
| 2003/0225892 A1* | 12/2003 | Takusagawa et al. ........ | 709/227 |
| 2004/0013116 A1 | 1/2004 | Greis et al. | |
| 2004/0156365 A1* | 8/2004 | Suzuki et al. ............... | 370/389 |
| 2006/0018291 A1* | 1/2006 | Patel et al. .................. | 370/335 |
| 2006/0233135 A1* | 10/2006 | Oswal et al. ................. | 370/331 |

FOREIGN PATENT DOCUMENTS

| | | |
|---|---|---|
| WO | 2007/001953 A1 | 1/2007 |
| WO | 2009/002075 A2 | 12/2008 |

OTHER PUBLICATIONS

S. Gundavelli et al., Proxy Mobile IPv6, NETLMM WG, Internet Draft, Jun. 18, 2007.
R. Wakikawa et al., IPv4 Support for Proxy Mobile IPv6, NETLMM Working Group, Internet Draft, Jul. 9, 2007.
I. Akiyoshi et al., NETLMM Protocol, NETLMM, Internet Draft, pp. 1-15, Oct. 2005.
G. Giaretta et al., Network-based localized mobility management (NETLMM) with distributed anchor routers, NETLMM BOF, Internet Draft, pp. 1-39, Oct. 14, 2005.
International Search Report from corresponding application PCT/IB2008/053731.

* cited by examiner

*Primary Examiner* — Hassan Phillips
*Assistant Examiner* — Anez Ebrahim
(74) *Attorney, Agent, or Firm* — Dilip C. Andrade; Ericsson Canada Inc.

(57) ABSTRACT

A method and nodes are provided for localizing traffic between communication nodes receiving service from a same network. A local mobility anchor informs media access gateways providing access to two communication nodes of each other's addresses. Traffic exchanged between the two communication nodes connected to the same network via these media access gateways are routed directly between the gateways, bypassing the local mobility anchor.

21 Claims, 6 Drawing Sheets

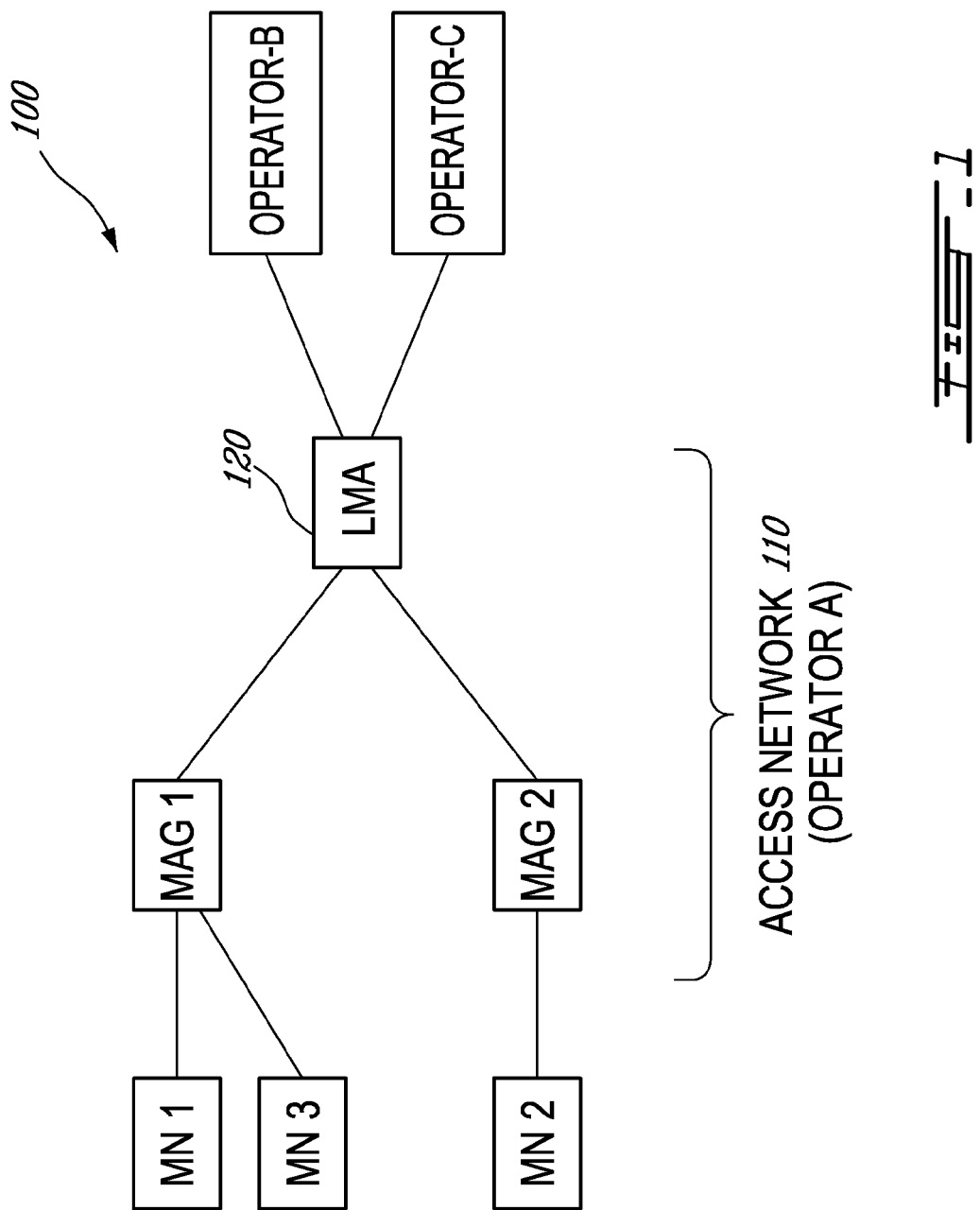

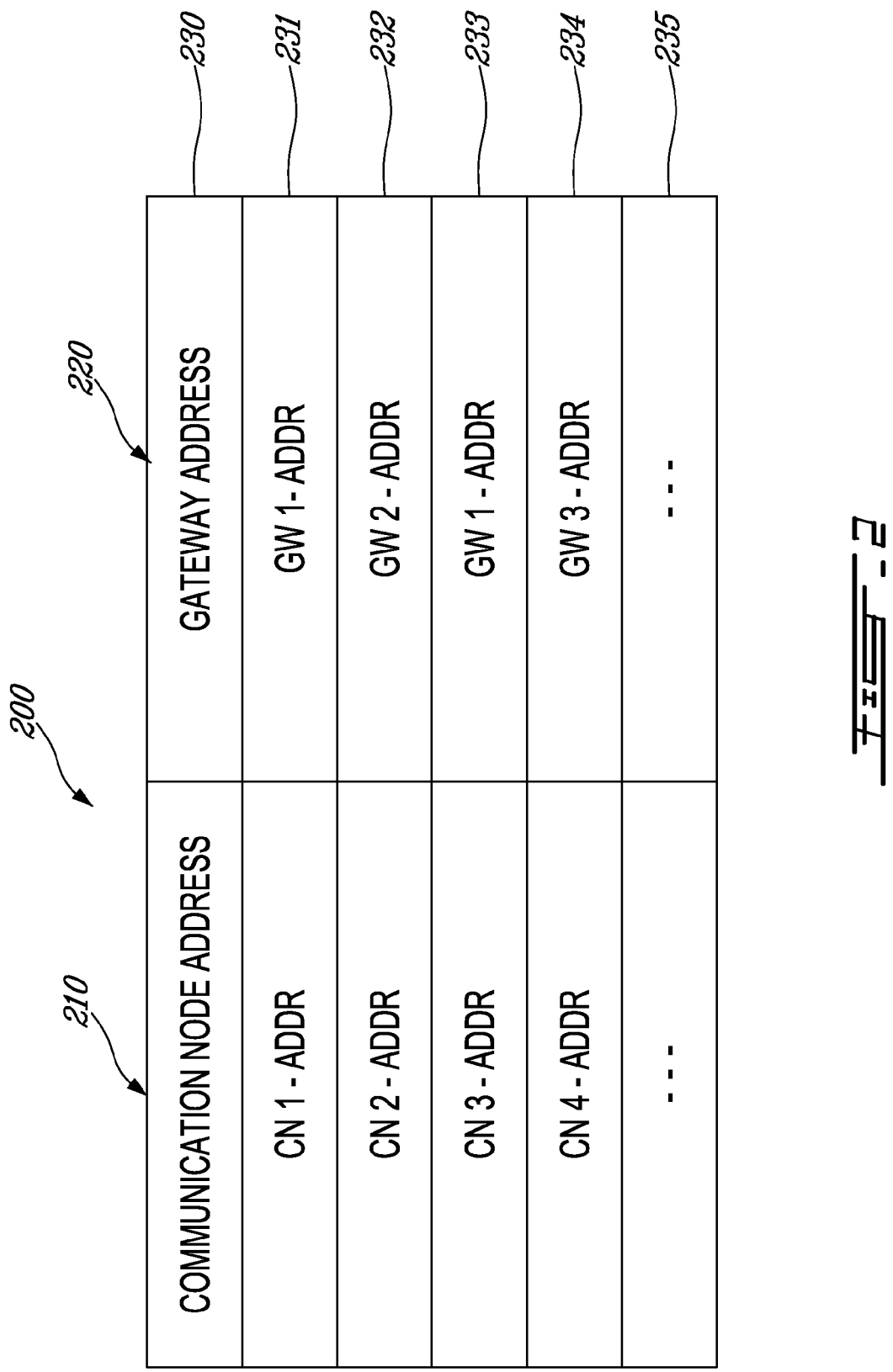

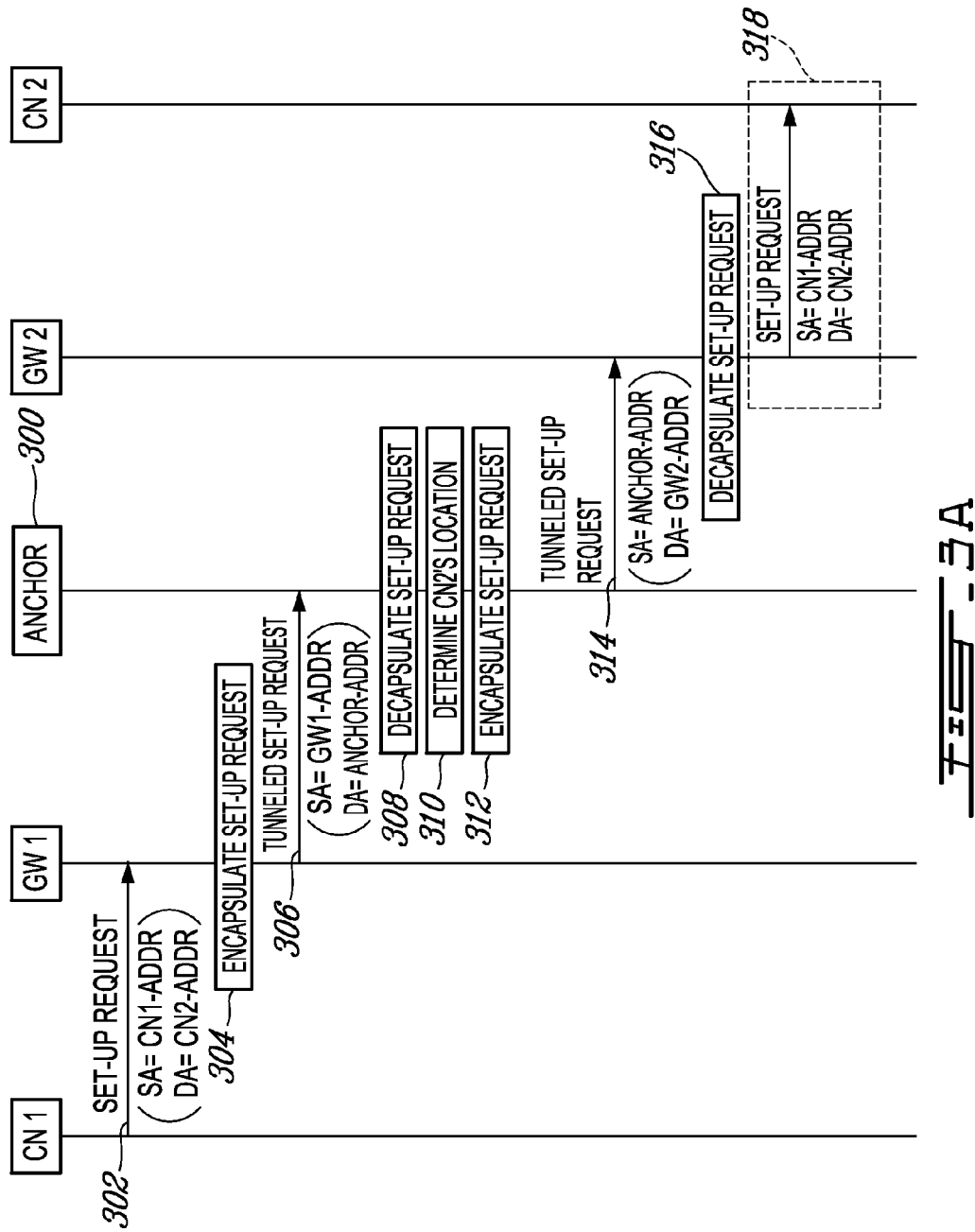

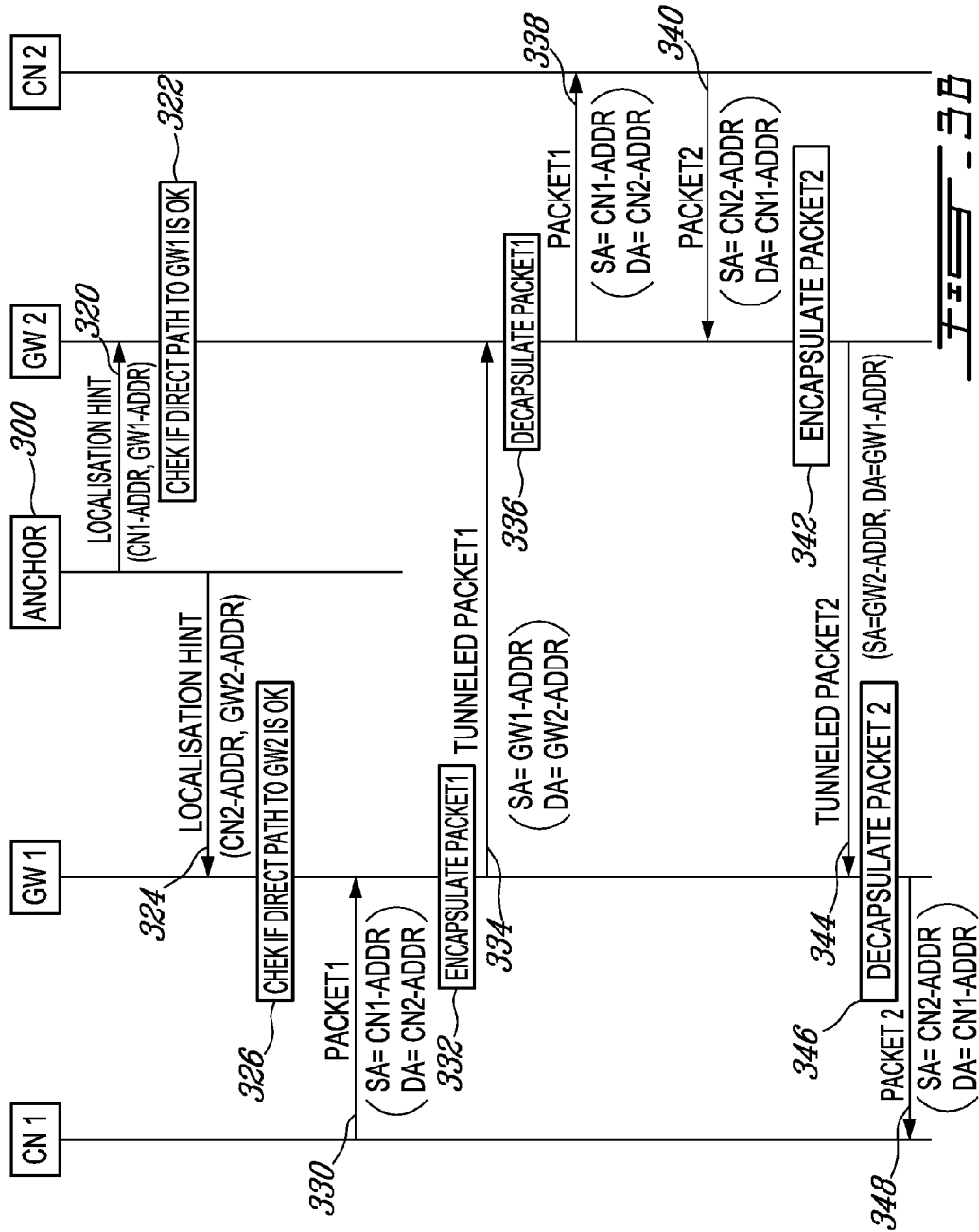

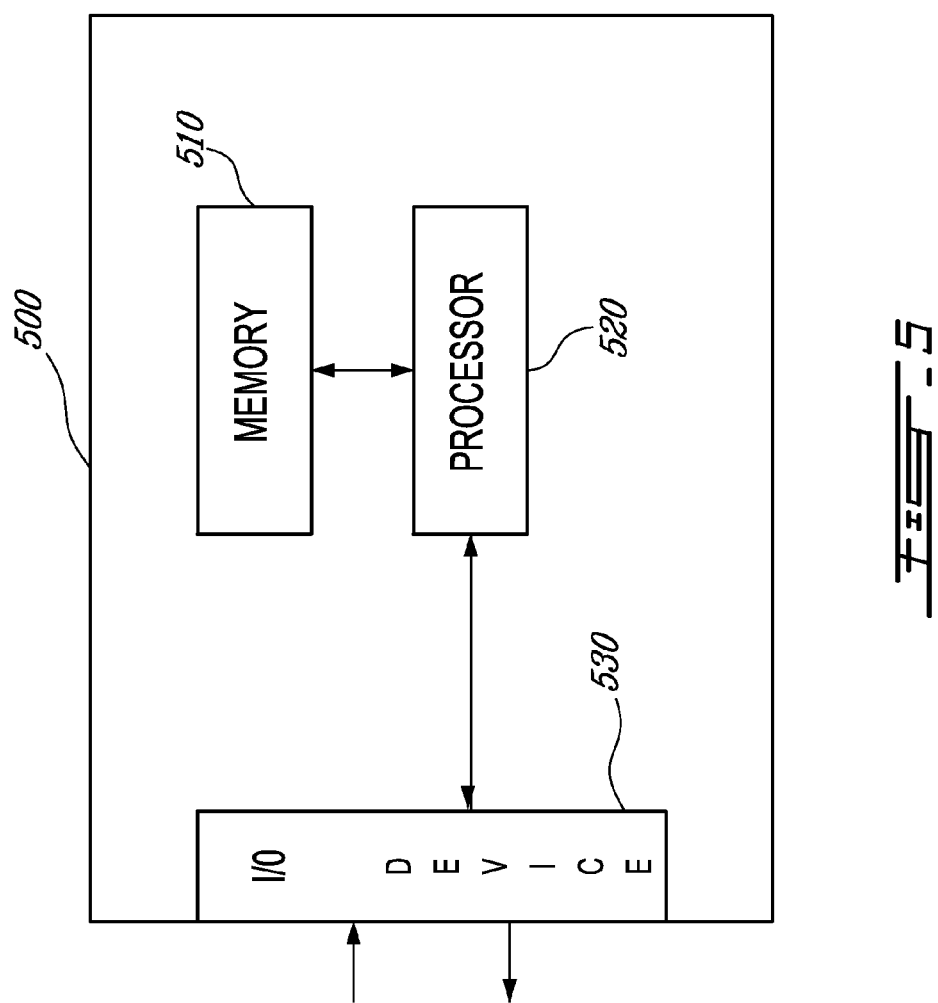

TRAFFIC LOCALIZATION WITH PROXY MOBILITY

PRIORITY STATEMENT UNDER 35 U.S.C. S.119(e) & 37 C.F.R. S.1.78

This non-provisional patent application claims priority based upon the prior U.S. provisional patent application entitled "Traffic Localization with Proxy Mobility", application No. 60/974,663, filed Sep. 24, 2007, in the names of Suresh Krishnan and Laurent Marchand.

BACKGROUND OF THE INVENTION

1. Field of the Invention

The present invention relates to a method and nodes for efficient localization of traffic in Proxy Mobile IP networks and in other networks using access gateways.

2. Description of the Related Art

Mobile Internet Protocol (IP) is a protocol that provides routing of IP datagram to a mobile node (MN) as it travels through the Internet. The MN has a home IP address, which is used when the MN is located within a home domain. The home domain provides a subscription and the home IP address to the MN. When the MN is located outside of the home domain, it acquires a care-of address from a visited domain. The visited domain informs the home domain of the care-of address allocated to the MN in a so-called binding process. When a packet or datagram is received in the home domain identifying the home address as a destination, while the MN is known to be roaming in the visited domain, the home domain forwards the packet towards the MN in a tunnel, with the care-of address as a new destination address. Mobile IP requires that the MN be capable of detecting whether it is located in the home or in a visited network, and acquiring a care-of address.

Many devices, such as laptops or personal assistants, may be moved by their users, but do not have those capabilities. The user of a mobile device may elect to disable its Mobile IP capability, for example to reduce signaling on a wireless link between the mobile device and an access point of a visited domain.

Proxy Mobile IP (PMIP) provides Mobile IP features to MNs that do not support mobility. With PMIP, the MN does not need to support any mobility related signaling. Mobility features are solely supported by the network. The care-of address that was assigned by a visited network to the MN, in Mobile IP, is replaced in PMIP by a proxy care-of address (pCoA). The pCoA is the address of a gateway that provides connectivity to the MN. A description of PMIP is made in an Internet Engineering Task Force (IETF) publication entitled "Proxy Mobile IPv6", by S. Gundavelli et al., available at http://www3.tools.ietf.org/html/draft-ietf-netlmm-proxymip6-01. Another description may be found in US Patent Application no. 2004/0013116, "Method of providing mobile IP functionality for a non mobile IP capable mobile node and switching device for acting as a mobile IP proxy", to Greis et al.

FIG. 1 (Prior Art) show a Proxy Mobile IP (PMIP) network 100, consistent with the two foregoing references. The network 100 comprises three subnetworks owned by three distinct operators A, B and C. An access network 110 of operator A comprises a local mobility anchor (LMA) 120, sometimes called local mobility agent, and two media access gateways (MAG) MAG1 and MAG2, which are also sometimes referred to as proxy mobile agents, and which provide PMIP support to MNs. Mobile nodes, for example MN1, MN3 and MN2, are subscribed in the subnetworks of operators B and/or C, but are currently located within the access network 110 of operator A. The LMA is used within operator A's subnetwork to manage local mobility. In an exemplary fashion, MN1 and MN3 are connected to MAG1 and MN2 is connected to MAG2. The MNs may be connected to the MAGs directly or through access points (not shown), which may be wireless access points. Of course, those skilled in the art will recognize that the subnetworks of each operator may comprise a plurality of MAGs and LMAs. Also, the subnetworks would comprise supplementary nodes such as routers, home agents, foreign agents, databases, and the like. Those supplementary nodes are not depicted in FIG. 1 for ease of the description of the problems present in the prior art.

When a given MN attaches to a domain that supports PMIP, it sends an access request, possibly through an access point, which arrives at a MAG. The MAG sends information about the access request to a home agent of the MN. The home agent sends information regarding a home prefix of the MN to the MAG. The MAG advertises this prefix on a link to the MN. This makes the MN act as if the MAG was its home agent. The MAG sends a Proxy Binding Update (PBU) message to the LMA with its own address, called the proxy Care-of Address (pCoA), to be used as a care-of address of the MN. The LMA stores in a binding cache the pCoA and a home address of the MN, the pCoA being used as an identity of the MAG that currently provides access to the MN. If the MN is roaming, implying that the LMA is not part of the home domain for the MN, the LMA builds a regional care-of address (rCoA) and sends the rCoA to the home domain of the MN, thereby making the home domain forward traffic intended to the MN as per the Mobile IP protocol. In a first global mobility process, a packet intended for the MN is sent from the home domain through the LMA by use of the rCoA. Then, in a second local mobility process, the LMA encapsulates this packet and tunnels it to the MAG by use of the pCoA. The MAG receives this packet, decapsulates it, and sends it to the MN. Packets originating from the MN are sent through the MAG to the LMA and then to their destination addresses.

Two MNs that may be attached to same MAG or to distinct MAGs under the same LMA may need to communicate. For example, referring again to FIG. 1, MN1 and MN2 may communicate with each other. When PMIP is used, the two MNs need to use a sub-optimal path leading from a first MAG to the LMA and then to a second MAG, even if there is a shorter direct path between the two MAGs. If two MNs are connected to the same MAG, for example MN1 and MN3 of FIG. 1, which are both connected to MAG1, packets exchanged therebetween still need to transit through the LMA 120. This leads to unnecessary wastage of bandwidth on the links between the MAGs and the LMA, these links usually having limited bandwidth and being costly to operate.

SUMMARY OF THE INVENTION

There would be clear advantages of having a method and nodes for reducing the amount of traffic that unnecessarily transits through an anchor when gateways are capable of communicating directly with each other.

It is therefore a broad object of this invention to provide a method and nodes for providing to gateways, which give network access to communication nodes, with each other's addresses in order for the gateways to directly route therebetween data packets exchanged between the communication nodes.

A first aspect of the present invention is directed a method of routing data packets between communication nodes. The method starts by sending from a gateway serving a first communication node, towards an anchor, an address of the first communication node and an address of a second communication node. The gateway serving the first communication node receives, from the anchor, an address of a gateway serving the second communication node. The gateway serving the second communication node receives, from the anchor, an address of the gateway serving the first communication node and the address of the first communication node. Either the gateway serving the first communication node or the gateway serving the second communication node receives a data packet from one of the communication nodes. That gateway uses the address of the gateway serving the other communication node to forward the data packet towards the other communication node.

A second aspect of the present invention is directed to a method of routing data packets between communication nodes. The method starts when an anchor receives, from a gateway serving a first communication node, an address of the first communication node and an address of a second communication node. The anchor determines a gateway serving the second communication node. The anchor sends towards the gateway serving a first communication node, an address of the gateway serving the second communication node. The anchor also sends towards the gateway serving the second communication node, an address of the gateway serving a first communication node and the address of the first communication node.

A third aspect of the present invention is directed to an anchor for supporting traffic localization between gateways. The anchor comprises a memory that stores addresses of a plurality of communication nodes, each communication node address being stored in relation with an address of a gateway providing service thereto. The anchor also comprises an input-output device for sending messages to, and receiving messages from, one or more gateways. The anchor further comprises a processor. The processor receives from the input-output device an address of a gateway serving a first communication node, an address of the first communication node and an address of a second communication node. It locates in the memory the address of the second communication node and an address of a gateway serving the second communication node. The processor then requests the input-output device to send the address of the gateway serving the first communication node and the address of the first communication node towards the gateway serving the second communication node. It further requests the input-output device to send the address of the gateway serving the second communication node towards the gateway serving the first communication node.

A fourth aspect of the present invention is directed to a gateway for connecting directly with a peer gateway. The gateway comprises an input-output device for receiving from an anchor an address of the peer gateway and an address of a communication node. The gateway also comprises a memory for storing a relation between the address of the communication node and the address of the peer gateway. The gateway further comprises a processor that verifies whether routing can be made towards the address of the peer gateway. If so, the processor directs towards the address of the peer gateway a message intended for the communication node.

BRIEF DESCRIPTION OF THE DRAWINGS

For a more detailed understanding of the invention, for further objects and advantages thereof, reference can now be made to the following description, taken in conjunction with the accompanying drawings, in which:

FIG. 1 is a prior art representation of a Proxy Mobile IP network;

FIG. 2 shows an exemplary content of a binding cache in an anchor, as per some teachings of the present invention;

FIGS. 3a and 3b show a sequence diagram depicting exemplary steps of the method of the present invention;

FIG. 5 shows an exemplary gateway according to an aspect of the present invention.

DETAILED DESCRIPTION

Figure 4:
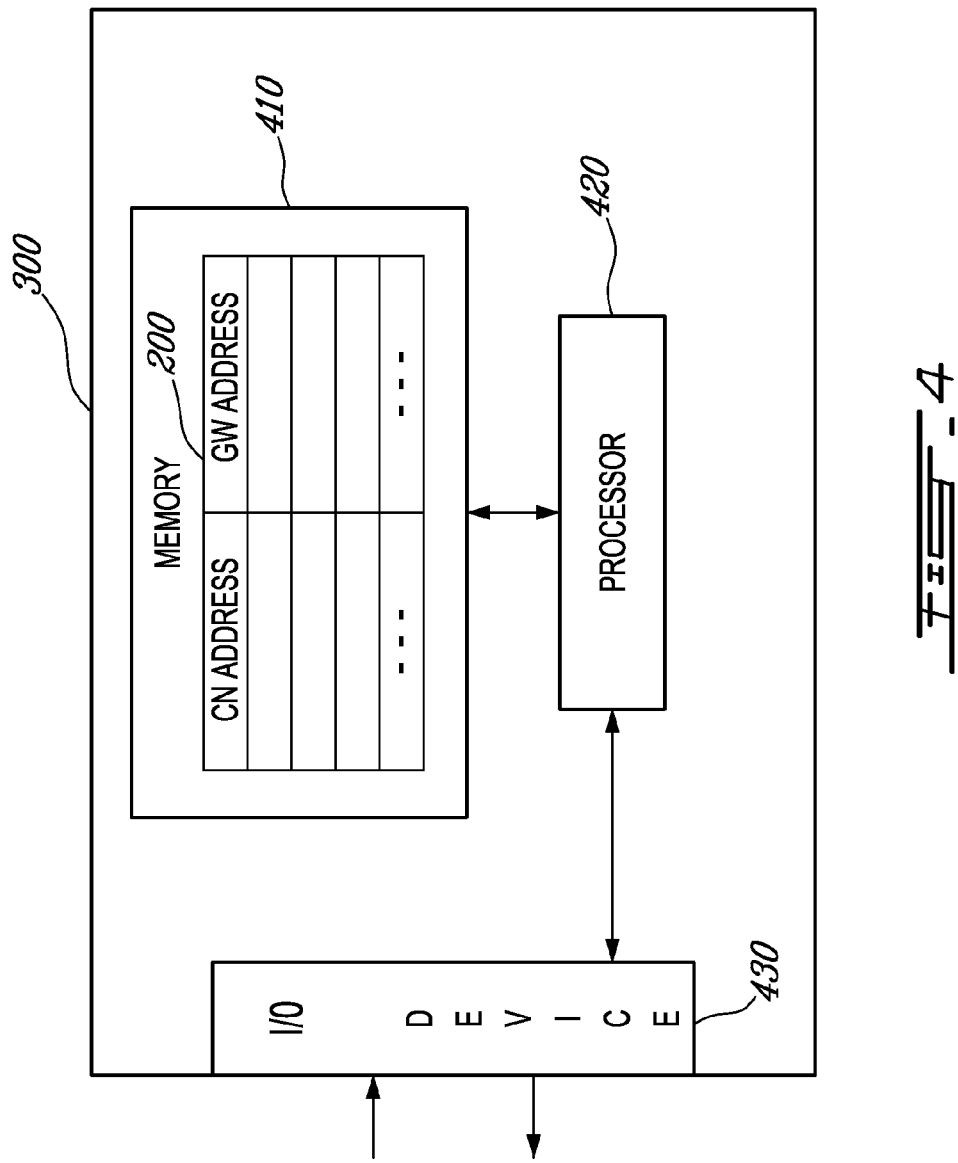
FIG. 4 shows an exemplary anchor according to an aspect of the present invention.

The innovative teachings of the present invention will be described with particular reference to various exemplary uses and aspects of the preferred embodiment. However, it should be understood that this embodiment provides only a few examples of the many advantageous uses of the innovative teachings of the invention. In general, statements made in the specification of the present application do not necessarily limit any of the various claimed aspects of the present invention. Moreover, some statements may apply to some inventive features but not to others. In the description of the figures, like numerals represent like elements of the invention.

The present invention provides a method and nodes for localizing, whenever possible, data traffic between two communication nodes (CN) located within a same network. Considering for example a Proxy Mobile Internet Protocol (PMIP) network, wherein a local mobility anchor (LMA) manages local mobility within the network, and media access gateways (MAG) provide access to the CNs. Traffic exchanged between the two CNs, when these obtain access to the network via MAGs that are part of a same network, should preferably avoid transiting through the LMA. Traffic localization as per the present invention eliminates the LMA from any data path between the two CNs, and uses a direct route between the MAGs. The present invention comprises signaling between an anchor and gateways (GW) that support a number of CNs, conveying addressing information that enables the gateways to communicate via direct routes.

In the context of the present invention, a CN may comprise a mobile cellular telephone, a mobile node, a digital personal assistant, a laptop computer, an IP television apparatus, a gaming device, a server, and the like. The GW may for example be an improved MAG and may further comprise wired or wireless access point capabilities. The anchor may for example be a LMA, modified as per the teachings of the present invention.

Reference is now made to the Drawings, in which FIG. 2 shows an exemplary content of a binding cache 200 in an anchor, as per some teachings of the present invention. While the exemplary binding cache 200 is shown in FIG. 2 in the form of a table, such content is not limited thereto. The binding cache 200 could alternatively take the form of a relational database, or any like means of storing information. Each of the rows 231-235 of FIG. 2, at the exception of the first row 230, which is a header row, represents exemplary entries of the binding cache 200. While only a few rows are shown in FIG. 2, it will be understood that the binding cache 200 in a typical anchor would comprise a much larger number of entries. The binding cache 200 comprises two columns. A first column 210 on the left lists CNs that are being serviced by GWs within a subnetwork in which the anchor is located. A second column 220 on the right lists the GWs serving the corresponding CNs. In the exemplary binding cache 200 of FIG. 2, only addresses of the CNs and of the GWs are illustrated, the addresses of the CNs and of the GWs being used, in this example, as identities for these nodes. As is well-known in the art, per the Proxy Mobile IP protocol, the addresses of the GWs constitute proxy care-of addresses (pCoA) for the CNs. The binding cache 200 could comprise more columns listing other information such as identities (other than addresses) of the GWs and CNs, identities and/or addresses of home domains of the CNs, and the like. Such additional content of the binding cache 200 is not illustrated herein for simplicity of the description of the present invention.

FIGS. 3a and 3b show a sequence diagram depicting exemplary steps of the method of the present invention. Nodes involved in these exemplary steps are consistent with the rows 231 and 232 of the binding cache 200 of FIG. 2, and comprise two communication nodes CN1 and CN2, an anchor 300, and two gateways GW1 and GW2. The gateways may be implemented as modified media access gateways. While two distinct gateways are shown, CN1 and CN2 may be connected to a common gateway, in which case FIGS. 3a and 3b should be viewed considering that GW1 and GW2 are one and the same gateway. The anchor 300 may be implemented as a modified local mobility anchor. The two gateways and the anchor 300 may be comprised in a same operator network. Before the start of the sequence, the two CNs have registered with the two GWs, the CN1 having registered with the GW1 and the CN2 having registered with the GW2. The GWs have sent towards the anchor 300 a Proxy Binding Update (PBU) message for each of those registrations, the PBU messages comprising addresses of the CNs and of the GWs. The anchor 300 has stored in its binding cache 200 an entry for each of the CNs. If the anchor 300 is not part of a home domain for one of the CNs, the anchor 300 preferably has sent towards that home domain a regional care-of address to be used for routing data intended for that CN from that home domain towards the anchor 300.

The method starts at step 302 when one of the communication nodes, for example the CN1, sends towards the GW1 a request to set-up a session with the CN2. The set-up request comprises, as a source address (SA), an address CN1-ADDR of the CN1 and, as a destination address (DA), an address CN2-ADDR of the CN2. The set-up request may further comprise any content that may be useful in establishing communication between the CN1 and the CN2. In some cases, depending on an application shared by the two CNs, any first data packet sent by CN1 would be acceptable by CN2 to set up the session. The term set-up request is therefore used herein to designate any first message originated by the CN1, intended for the CN2, and sent towards the GW1, at the beginning of the session. The GW1 forwards the set-up request towards the anchor 300, preferably using tunneling. "Tunneling" as used herein means that the original set-up request, including the original SA and DA, is encapsulated at step 304 inside a larger packet that carries an outer header comprising its own outer SA and DA, prior to forwarding at step 306. This encapsulation process is preferred because it is compliant with Proxy Mobile IP. The outer SA of the tunneled set-up request is set equal to an address GW1-ADDR of the GW1. The outer DA of the tunneled set-up request is set equal to an address anchor-ADDR of the anchor 300. In addition to the outer SA, DA, and the encapsulated content of the original set-up request, the tunneled set-up request may also carry additional information, preferably also comprised in the outer header. The additional information may be used by the GW1 and anchor 300 for operation, maintenance, administration, or accounting purposes, and the like. At step 308, the anchor 300 having received the tunneled set-up request decapsulates this message to recuperate the original set-up request. Using the CN2-ADDR for looking in its binding cache 200, the anchor 300 determines at step 310 the current location of CN2 which, in the present example, points to the GW2. The anchor 300 forwards the set-up request towards the GW2, preferably encapsulating the request in a tunnel at step 312 prior to forwarding at step 314. New outer SA and DA are defined. The new outer SA of the tunneled set-up request is set equal to the address anchor-ADDR of the anchor 300. The new outer DA of the tunneled set-up request is set equal to an address GW2-ADDR of the GW2. The set-up request is decapsulated by the GW2 at step 316. At step 318, the GW2 may preferably forward the decapsulated set-up request, comprising the original SA and DA, towards CN2. This step may be useful in cases where the set-up request actually comprises useful data that CN2 should receive, or when a session protocol for use between CN1 and CN2 requires that the set-up request actually reaches CN2.

At steps 320 and 324, possibly in parallel with steps 314 to 318, the anchor 300 sends two new messages called localization hints towards the GWs. Generally, one localization hint message carries information indicating that a first CN accessing a first GW intends to communicate with a second CN accessing a second GW, that message being sent towards the second GW. One such message is sent towards each of the GW1 and the GW2. Specifically at step 320, the anchor 300 sends a localization hint comprising the CN1-ADDR and the GW1-ADDR towards the GW2. At step 324, a localization hint comprising the CN2-ADDR and the GW2-ADDR is sent towards the GW1. Those skilled in the art will note that the localization hint of step 324 could be sent without carrying the CN2-ADDR, because the GW1 already has had access to this information at step 302. At steps 322 and 326, each GW verifies whether a direct data path, which bypasses the anchor 300, can be set up towards the other GW, using the information received in the localization hints. Specifically, and by way of example, the GW1 may determine at step 326 that a path towards the GW2 can be used for forwarding data packets from CN1 to CN2.

Alternatively, at steps 322 and 326, either one or both of the two gateways may realize that, due for example to the absence or failure of routers therebetween or due to the lack of trusted means to authenticate the other GW's address, no direct path can effectively be used. In such a case, traffic localization will not take place and all data traffic between the CN1 and the CN2 will travel through the anchor 300. Of course, in those cases where CN1 and CN2 are connected to a common gateway (GW1 and GW2 being the same gateway), verifications at steps 332 and 326 will most often lead the common gateway to conclude that bypassing the anchor 300 can be made. Exceptions would still be possible when some other considerations prevent bypassing the anchor 300, such as for example, a policy enforcing all traffic arriving at CN2 to transit through the anchor 300 for monitoring purposes.

At steps 330 and 340, each CN sends a data packet towards the corresponding gateway, addresses of the CN1 and of the CN2 being used as source and destination addresses. The gateways, based on positive verifications made at steps 322 and 326, tunnel those data packets directly to the other gateways. By way of example, at steps 332 and 334, GW1 tunnels the packet received at step 330, encapsulated in a larger packet comprising as a SA the GW1-ADDR, as a DA the GW2-ADDR, and as payload the full packet received at step 330. At steps 336 and 338, GW2 decapsulates the tunneled data packet by removing the addresses of the gateways, and forwards the packet, as originated by the CN1, towards the CN2. Likewise at steps 342 and 344, GW2 tunnels the packet received at step 340, encapsulated in a larger packet comprising as a SA the GW2-ADDR, as a DA the GW1-ADDR, and as payload the full packet received at step 340. At steps 346 and 348, GW1 decapsulates the tunneled data packet by removing the addresses of the gateways, and forwards the packet, as originated by the CN2, towards the CN1. Of course, if GW1 and GW2 are one and the same common gateway, and still based on positive verifications made at steps 322 and 326, the packets arriving at steps 330 and 340 will immediately be forwarded by the common gateway at steps 338 and 348, respectively, without the steps of encapsulating, tunneling and decapsulating.

An exemplary construction of an anchor 300 will now be described by reference to FIG. 4, which shows an exemplary anchor according to an aspect of the present invention. The anchor 300, as used in FIGS. 3a and 3b, has been modified as per the teachings of the present invention, compared to a prior art local mobility anchor. The anchor 300 comprises a memory 410, a processor 420, and an input/output (I/O) device 430. The memory 410 is a non-volatile memory, or persistent memory, that can be electrically erased and reprogrammed and that may be implemented, for example, as a flash memory or as a data storage module. The I/O device 430 may be implemented as one single device or as distinct devices for receiving (input) and sending (output) signaling, messages and data. The anchor 300 is connected towards a plurality of gateways; means for connecting the anchor 300 towards distinct gateways may vary as, for example, connection towards one gateway might be on an Ethernet link while connection towards another gateway might be on an asynchronous transfer mode (ATM) link. Therefore the I/O device 430 may comprise a plurality of devices for connecting on a plurality of links of different types. Only one generic I/O device 430 is illustrated for ease of presentation of the present invention. The anchor 300 may further act as a router and may thus comprise many more components, as is well-known in the art.

The memory 410 stores home addresses of a plurality of CNs located within a domain of an operator owning the anchor 300. The home addresses of the CNs are stored in relation with addresses of one or more gateways providing service to the CNs, each CN being related to one of the gateways. The relations are stored within a table in the memory 410, preferably within a binding cache 200 substantially as shown on FIG. 2. The I/O device 430 receives a set-up request. The I/O device 430 forwards this request to the processor 420. The set-up request may have been encapsulated within a larger packet comprising, as a source address, an address of a first, originating gateway and, as a destination address, an address of the anchor 300. The processor 420 decapsulates the set-up request, if required. Within the set-up request, the processor 420 reads an address of a first CN and an address of a second CN. The processor 420 locates in the memory the addresses of the first and second CNs, along with addresses of corresponding first and second gateways. Alternatively, the processor 420 may read the address of the first gateway directly from the encapsulated set-up request, as this message comprises the address of this first gateway as a source address. While the first and second gateways may actually comprise one single gateway, common to the first and second CNs, the anchor 300 treats the gateway addresses independently. The processor 420 requests the input-output device to send localization hints to each of the two gateways. A first localization hint, comprising the address of the first gateway and the address of the first CN, is sent towards the second gateway. A second localization hint, comprising the address of the second gateway and optionally comprising the address of the second CN, is sent towards the first gateway.

An exemplary construction of gateway as used in FIGS. 3a and 3b will now be described by reference to FIG. 5, which shows an exemplary gateway according to an aspect of the present invention. The gateway 500, as used in FIGS. 3a and 3b, has been modified as per the teachings of the present invention, compared to a prior art media access gateway. The gateway 500 comprises a memory 510, a processor 520, and an input/output (I/O) device 530. The memory 510 is a non-volatile memory, or persistent memory, that can be electrically erased and reprogrammed and that may be implemented, for example, as a flash memory or as a data storage module. The I/O device 530 may be implemented as one single device or as distinct devices for receiving (input) and sending (output) signaling, messages and data. The gateway 500 is connected towards a plurality of CNs, either directly or through an access point; means for connecting the gateway 500 towards distinct CNs may vary as, for example, connection towards one CN might be on an Ethernet link while connection towards another CN might be on a wireless local area network connection. The gateway 500 may be connected to the CNs through an access point, the connection between the access point and the I/O device 530 being by use of an Ethernet link, for example. Likewise, the gateway 500 is connected towards the anchor 300, by means that may comprise any type of wired or wireless connection. Therefore the I/O device 530 may comprise a plurality of devices for connecting on a plurality of links of different types. The term I/O device 530 is used in the singular solely for ease of presentation of the present invention. The gateway 500 may further act as a router and may thus comprise many more components, as is well-known in the art.

The I/O device 530 receives a localization hint from the anchor 300. The I/O device 530 forwards this localization hint to the processor 520. Within the localization hint, the processor 520 reads an address of a peer gateway and an address of a distant CN served by this peer gateway. The processor 520 verifies whether or not signaling and routing of data packets towards the address of the peer gateway is allowed; the manner in which this verification is made is well-known in the art and may comprise, for example, pinging the address of the peer gateway. Of course, if the address of the peer gateway is identical to an own address of the gateway 500, the gateway 500 and the peer gateway are one and the same. In that case, if no special policy prevents bypassing of the anchor 300, signaling and routing of data packets towards the address of the peer gateway is deemed allowed. The processor 520 stores in the memory 510 a relation between the addresses of the peer gateway and of the distant CN.

The I/O device 530 may then receive a first data packet from a first, near CN. The first data packet comprises, as a destination address, the address of the distant CN. The processor 520 reads from the memory 510 the address of the peer gateway by use of the address of the distant CN. The processor 520 builds a first encapsulated data packet comprising, as a source address, an address of the gateway 500 and, as a destination address, the address of the peer gateway. The processor 520 requests the I/O device 530 to send the first encapsulated data packet towards the peer gateway. The I/O device 530 may also receive a second encapsulated data packet from the peer gateway. The processor 520 decapsulates the second encapsulated data packet to make a second data packet, and reads therein an address of the near CN. The processor requests the I/O device 530 to send the second data packet towards the near CN, either directly or through an access point.

The I/O device 530 may receive another data packet from a second, near CN, that data packet comprising, as a destination address, an address of a third, near CN. The processor 520 reads from the memory 510 the address of the peer gateway serving the third CN. The processor 520 finds, by comparing the address of the peer gateway with the own address of the gateway 500, that these addresses are identical. The processor requests the I/O device 530 to send that data packet towards the third CN.

Although several aspects of the preferred embodiment of the method, of the anchor and of the gateway of the present invention have been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

The invention claimed is:

1. A method of routing data packets between communication nodes, the method comprising the steps of:
sending from a gateway serving a first communication node, towards an anchor, an address of the first communication node and an address of a second communication node;
receiving, from the anchor, at the gateway serving the first communication node, an address of a gateway serving the second communication node;
receiving, from the anchor, at the gateway serving the second communication node, an address of the gateway serving the first communication node and the address of the first communication node;
receiving at the gateway serving the first communication node or at the gateway serving the second communication node a data packet from one of the first and second communication nodes; and
using at the gateway having received the data packet from one of the first and second communication nodes the address of the gateway serving the other one of the first and second communication nodes to eliminate the anchor from a data path between said first and second communication nodes and to directly forward the data packet towards the other one of the first and second communication nodes without sending said packet via said anchor.

2. The method of claim 1, wherein:
the anchor is a local mobility anchor;
the gateway serving the first communication node is a media access gateway;
the gateway serving the second communication node is a media access gateway; and
the local mobility anchor, the gateway serving the first communication node and the gateway serving the second communication node support a proxy mobile internet protocol.

3. The method of claim 2, wherein
the address of the gateway serving the first communication node is a proxy care-of address for the first communication node; and
the address of the gateway serving the second communication node is a proxy care-of address for the second communication node.

4. The method of claim 1, wherein:
the gateway serving the first communication node, the gateway serving the second communication node and the anchor are part of a same operator network.

5. The method of claim 1, further comprising the step of:
receiving, from the anchor, at the gateway serving the first communication node, the address of the second communication node.

6. The method of claim 1, wherein:
receiving at the gateway serving the first communication node or at the gateway serving the second communication node the data packet from one of the first and second communication nodes comprises receiving at the gateway serving the second communication node, from the second communication node, the data packet comprising as a destination address the address of the first communication node.

7. The method of claim 1, wherein:
using at the gateway having received the data packet from one of the first and second communication nodes the address of the gateway serving the other one of the first and second communication nodes to forward the data packet towards the other one of the first and second communication nodes comprises encapsulating the data packet in a tunnel at the gateway serving the first communication node; and
the encapsulated data packet comprises the addresses of the gateway serving the first communication node as a source address and the address of the gateway serving the second communication node as a destination address.

8. The method of claim 7, further comprising the steps of:
receiving the encapsulated data packet at the gateway serving the second communication node;
decapsulating the data packet at the gateway serving the second communication node; and
forwarding the decapsulated data packet from the gateway serving the second communication node towards the second communication node.

9. The method of claim 1, further comprising the step of:
storing at the gateway serving the first communication node the address of the second communication node in relation with the gateway serving the second communication node.

10. A method routing data packets between communication nodes, the method comprising the steps of:
receiving at an anchor, from a gateway serving a first communication node, an address of the first communication node and an address of a second communication node;
determining at the anchor a gateway serving the second communication node;
determining that said first and second communication nodes obtain network access via gateways which are part of a single network such that a data path can be established between said gateways which bypasses said anchor;
sending from the anchor, towards the gateway serving a first communication node, an address of the gateway serving the second communication node; and
sending from the anchor, towards the gateway serving the second communication node, an address of the gateway serving a first communication node and the address of the first communication node.

11. The method of claim 10, further comprising the step of:
receiving, from the anchor, at the gateway serving the first communication node, the address of the second communication node.

12. The method of claim 10, further comprising the step of:
   storing at the gateway serving the first communication node the address of the second communication node in relation with the gateway serving the second communication node.

13. The method of claim 10, wherein:
   a common gateway is serving the first communication node and the second communication node.

14. The method of claim 13, further comprising the steps of:
   receiving at the common gateway, from one of the first and second communication nodes, a data packet comprising as a destination address the address of the other communication node; and
   forwarding the data packet from the common gateway towards the other one of the first and second communication nodes.

15. The method of claim 10, wherein:
   the gateway serving the first communication node and the gateway serving the second communication node are distinct gateways.

16. The method of claim 15, further comprising the steps of:
   receiving at the gateway serving the second communication node, from the second communication node, a data packet comprising as a destination address the address of the first communication node; and
   encapsulating at the gateway serving the second communication node the data packet by using the address of the gateway serving the first communication node as a destination address and the address of the gateway serving the second communication node as a source address.

17. The method of claim 16, further comprising the steps of:
   receiving the encapsulated data packet at the gateway serving the first communication node;
   decapsulating the data packet at the gateway serving the first communication node; and
   forwarding the decapsulated data packet from the gateway serving the first communication node towards the first communication node.

18. An anchor for supporting traffic localization between gateways, comprising:
   a memory adapted to store addresses of a plurality of communication nodes, each communication node address being stored in relation with an address of a gateway providing service thereto;
   an input-output device adapted to send messages to, and receive messages from, one or more gateways; and
   a processor adapted to:
   receive from the input-output device an address of a gateway serving a first communication node, an address of the first communication node and an address of a second communication node,
   locate in the memory the address of the second communication node and an address of a gateway serving the second communication node,
   determine that said first and second communication nodes are co-located within the same network such that a data path can be established between said gateways which bypasses said anchor
   request the input-output device to send the address of the gateway serving the first communication node and the address of the first communication node towards the gateway serving the second communication node, and
   request the input-output device to send the address of the gateway serving the second communication node towards the gateway serving the first communication node.

19. The anchor of claim 18, wherein:
   the processor is further adapted to locate in the memory the address of the first communication node and the address of the gateway serving the first communication node.

20. The anchor of claim 18, wherein:
   the input/output device is configured to receive the addresses of the first and second communication nodes as a part of a set-up request.

21. The anchor of claim 18, wherein:
   the input/output device is configured to send the addresses of the gateways serving the first and second communication nodes as part of localization hints messages.

* * * * *

UNITED STATES PATENT AND TRADEMARK OFFICE
CERTIFICATE OF CORRECTION

PATENT NO. : 8,085,793 B2  
APPLICATION NO. : 11/948269  
DATED : December 27, 2011  
INVENTOR(S) : Krishnan et al.

Page 1 of 1

It is certified that error appears in the above-identified patent and that said Letters Patent is hereby corrected as shown below:

On the Face Page, in Field (73), under "Assignee", in Column 1, Line 1, delete "telefonaktiebolaget" and insert -- Telefonaktiebolaget --, therefor.

In Fig. 3B, Sheet 4 of 6, for Tag "322", in Line 1, delete "CHEK" and insert -- CHECK --, therefor.

In Fig. 3B, Sheet 4 of 6, for Tag "326", in Line 1, delete "CHEK" and insert -- CHECK --, therefor.

In Column 9, Line 57, in Claim 3, delete "wherein" and insert -- wherein: --, therefor.

In Column 12, Line 20, in Claim 18, delete "anchor" and insert -- anchor, --, therefor.

Signed and Sealed this  
Twenty-ninth Day of January, 2013

David J. Kappos  
*Director of the United States Patent and Trademark Office*